UNITED STATES PATENT OFFICE 2,056,449

ALKYLATED IMIDAZOLES OF HIGH MOLECULAR WEIGHT AND PROCESS OF MAKING SAME

Charles Graenacher, Basel, and Franz Ackermann, Binningen, near Basel, Switzerland, assignors to the firm of Society of Chemical Industry in Basle, Basel, Switzerland No Drawing. Application December 13, 1934, Serial No. 757,402. In Switzerland December 15, 1933

20 Claims. (Cl. 260—44)

The invention relates to the manufacture of alkylated imidazoles of high molecular weight and the derivatives thereof, by treating with an alkylating agent containing at least 7 carbon atoms and whose chain may be interrupted by an organogenic element (cf. Lehrbuch der Organischen Chemie by Paul Karrer, Leipzig (1928), page 4: "Zusammensetzung und Analyse organischer Verbindungen", particularly line 4) which, in respect of hydrogen, is not higher than trivalent, i. e. oxygen, sulfur and nitrogen, an imidazole characterized by the atom grouping

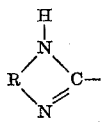

in which R is an aromatic nucleus. The organogenic elements which, in respect of hydrogen, are not higher than trivalent are oxygen, sulfur and nitrogen. As alkylating agents there may be named, for example, chloracetic-amyl ester, β-chloro-lactic-butyl ester, chloracetic-dodecyl ester, dodecyl-β-ethyl-chloride-ether, octadecyl-chloromethyl-ether, chloro-β-hydroxy-N-propyl-dodecylthio-ether (from dodecyl-mercaptan and epichlorhydrine), cetyl-β-chloroethylthio-ether, chloracetyl-decylamide, further alkylating agents without a bridge, such as heptyl-chloride, octyl-bromide, dodecyl-iodide, octadecenyl-chloride and the like. There come also into consideration sulfuric acid esters of higher alcohols and the like.

The products thus obtained have capillary activity, which renders them suitable for use as auxiliary agents in all industries in which agents for emulsifying, dispersing, softening, washing or wetting are used.

The capillary activity of the new products may be enhanced in many cases by further treating the product with an alkylating agent, whereby a quaternary ammonium compound is produced.

Products of like properties may also be obtained by treating with the alkylating agent containing at least 7 carbon atoms those imidazoles which contain at the nitrogen atom an alkyl radical consisting of at most 6 carbon atoms.

In the foregoing general formula R may be an aromatic nucleus, for example a nucleus of the benzene, naphthalene, anthracene, phenanthrene or diphenyl series or of any other series. It may comprise substituents, for example alkyl-, hydroxyl, oxalkyl-, carboxyl-, sulfo- or like groups. The substituents may also be of cyclic form, as is the case with tetrahydronaphthalene. As amidazoles which come into consideration here as parent materials there may be named both imidazoles themselves, such as benzimidazole, as well as their μ-substitution products. As such products there may be named the μ-alkylated benzimidazoles, such as μ-methyl-, μ-hydroxymethyl-, μ-ethyl-, μ-propyl-, μ-γ-hydroxypropyl-, μ-butyl-, μ-δ-hydroxybutyl-, μ-cyclohexyl-, μ-vinyl-, μ-phenyl-, μ-benzyl-, μ-undecyl-, μ-pentadecyl-, μ-heptadecenyl-benzimidazoles or naphthimidazoles. Finally the μ-substituent may be of a wholly different character, such as in the case of the methoxy- or μ-ethoxybenzimidazole, or in the case of the μ-mercapto- or μ-thioalkylbenzimidazole or naphthimidazole.

Among these products those are inter alia valuable in which the μ-substituent contains at the most 3 carbon atoms, as is the case for example with the μ-methylbenzimidazoles, the μ-ethylbenzimidazoles, the μ-aminobenzimidazoles and the benzimidazole itself.

Also those imidazoles demand a special interest whose μ-substituent consists of a long aliphatic chain, such as, for example, the pentadecyl- or heptadecenyl radical. These products then lead to new imidazole derivatives which are characterized by the fact that they have twice a characteristic lyophobe grouping.

Thus the new imidazoles are characterized by the atom grouping

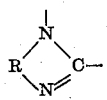

wherein the radical R has the meaning indicated above, wherein further the nature of the μ-substituent follows from the above enumerations, and wherein at least one of the two nitrogen atoms is linked with a radical R₁. If the products contain only a radical R₁ the latter stands for an alkyl group containing at least 7 carbon atoms. These products, in the form of their salts, correspond to the general formula

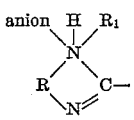

in which R is an aromatic radical and $R_1$ an alkyl group containing at least 7 carbon atoms, and wherein these carbon atoms may be present in the form of an uninterrupted chain or also in the form of a chain interrupted by an organogenic element which in respect of hydrogen is not higher than trivalent. Besides, the nature of these alkyl radicals follows from the alkylating agents cited above as examples. If the two nitrogen atoms are substituted by the radical $R_1$ these products form with acids imidazolium compounds which are characterized by the atom grouping

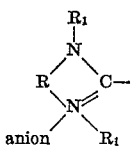

in which one $R_1$ has the meaning already indicated above, and the other $R_1$ stands for an alkyl group containing less than 7 carbon atoms. Not only the products wherein only one nitrogen atom is substituted by a radical $R_1$, but also the products wherein both nitrogen atoms are linked with a radical $R_1$ form with acids salts which represent solid fat-like masses, and which dissolve in water with formation of highly capillary active solutions. As acids capable of forming salts with such compounds there may be named hydrochloric acid, sulfuric acid, phosphoric acid, formic acid and the like.

The following examples whose number may be increased ad libitum illustrate the invention without, however, limiting the same:—

Example 1

52 parts of $\mu$-methylbenzimidazole are stirred with 80 parts of lauryl-chloride for about 8 hours at 160° C. As soon as a sample of the mass dissolves clearly in acidified water, the heating is interrupted and the reaction product allowed to cool; it is then a tallowy mass which can be dissolved in alcohol, if necessary, and decolorized completely by means of animal charcoal. The N - lauryl-$\mu$-methylbenzimidazole hydrochloride forms in water strongly foaming solutions and is, for example, a pronounced softening agent for viscose artificial silk. Similar products are obtained when cetyl-, stearyl- or oleyl-chloride is used instead of lauryl-chloride.

Example 2

183 parts of benzimidazole are stirred with 260 parts of cetyl chloride at 160° C. until a sample of the mass dissolves clearly in water containing formic acid. After cooling, the product is a bright colored semi-solid mass which has properties similar to those of the product described in Example 1.

Example 3

50 parts of N-cetyl-$\mu$-methylbenzimidazole-hydrochloride, obtainable as described in Example 1, are dissolved in hot water with addition of a small proportion of formic acid, whereupon the addition of caustic soda solution precipitates the free base in the form of an oil which solidifies when cooled. This oil is separated from the aqueous layer, washed and dried.

40 parts of this base are heated with 15 parts of ethyl-chloride for 12 hours in a pressure vessel to 150–155° C. After distilling the excess of ethyl-chloride there is left a semi-solid mass easily soluble in water and of pronounced dispersing action; this compound also has the property of enhancing essentially the fastness to water of dyeings obtained with direct dyestuffs.

Example 4

132 parts of $\mu$-methylbenzimidazole are heated with 270 parts of chloracetic dodecyl ester for about 6 hours to 170–175° C. After cooling there is obtained a soft fatty mass of $\mu$-methyl-N-acetic dodecyl ester-imidazole hydrochloride. The latter is soluble in acidified water to a foaming solution and may be used inter alia for making dyed fabrics fast to water and as softening agent.

Example 5

14.8 parts of $\mu$-hydroxymethylbenzimidazole and 20 parts of dodecylchloride are stirred at 170–180° C. until a sample of the mass dissolves clearly in acidified water. As soon as this is the case the reaction product is allowed to cool. The $\mu$-hydroxymethyl-N-laurylbenzimidazole-hydrochloride thus obtained forms a semi-solid mass which is soluble in water to a foaming solution and which may find application for example as acid levelling agent in dyeing.

A similar product is obtained when using equimolecular quantities of $\mu$-methoxymethylbenzimidazole instead of the $\mu$-hydroxymethylbenzimidazole.

Example 6

21.2 parts of $\mu$-methyl-N-hydroxyethyl-benzimidazole hydrochloride and 28 parts of stearic acid chloride are heated for 4 hours to 105–110° C., while stirring. After cooling there is obtained a colorless powder of $\mu$-methyl-N-stearylhydroxyethyl-imidazole hydrochloride which may be used for example as levelling agent in dyeing or as softening agent.

Example 7

7.3 parts of $\mu$-ethylbenzimidazole and 9.4 parts of octylbromide are heated for about 18 hours to 150–155° C. After cooling the $\mu$-ethyl-N-octyl-benzimidazole-hydrobromide is obtained as a solid mass which is soluble in acidified water and possesses excellent levelling properties.

Example 8

33.6 parts of $\mu$-heptadecyl-benzimidazole and 21 parts of dodecyl chloride are stirred for 16 hours at 170° C. When cold the mass is treated with benzine in order to remove any dodecyl chloride still present, the N-dodecyl-$\mu$-heptadecyl-benzimidazole hydrochloride being precipitated as an insoluble residue.

By treatment with a suitable alkylating agent, such as methyl chloride, this compound may be converted into a soluble quarternary ammonium salt.

Example 9

33.6 parts of $\mu$-heptadecyl-benzimidazole and 26.3 parts of 2-chloracetic dodecyl ester are stirred for 16 hours at 170° C. When cold the mass is treated with benzine in order to remove any 2-chloracetic dodecyl ester still present, the N-acetic-dodecylester-μ-heptadecylbenzimidazole hydrochloride being precipitated as an insoluble residue.

By treatment with a suitable alkylating agent, such as methyl chloride, this compound may be converted into a soluble quaternary ammonium salt.

What we claim is:—

1. Process for the manufacture of alkylated imidazoles of high molecular weight, consisting in treating imidazoles of the atom grouping

in which R is a carbocyclic aromatic nucleus containing at the most 10 carbon atoms and $R_2$ is a member selected from the group consisting of hydrogen and alkyl, with such alkylating agents which contain at least 7 carbon atoms.

2. Process for the manufacture of alkylated imidazoles of high molecular weight, consisting in treating imidazoles of the atom grouping

in which R is an aromatic nucleus of the benzene series and $R_2$ is a member selected from the group consisting of hydrogen and alkyl, with such alkylating agents which contain at least 7 carbon atoms.

3. Process for the manufacture of alkylated imidazoles of high molecular weight, consisting in treating imidazoles of the atom grouping

in which R is an aromatic nucleus of the benzene series and in which the μ-substituent $R_2$ is an aliphatic radical which contains at the most 3 carbon atoms, with such alkylating agents which contain at least 7 carbon atoms.

4. Process for the manufacture of alkylated imidazoles of high molecular weight, consisting in treating imidazoles of the atom grouping

in which R is an aromatic nucleus of the benzene series and in which the μ-substituent $R_2$ consists of an alkyl radical containing itself at the most 3 carbon atoms, with such alkylating agents which contain at least 7 carbon atoms.

5. Process for the manufacture of alkylated imidazoles of high molecular weight, consisting in treating imidazoles of the atom grouping

in which R is an aromatic nucleus of the benzene series and in which the μ-substituent $R_2$ consists of an alkyl radical containing itself at the most 3 carbon atoms, with such alkylating agents which consist of at least 7 carbon atoms united with one another.

6. Process for the manufacture of alkylated imidazoles of high molecular weight, consisting in treating imidazoles of the atom grouping

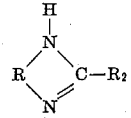

in which R is an aromatic nucleus of the benzene series and in which the μ-substituent $R_2$ consists of an alkyl radical containing itself at the most 3 carbon atoms, with such alkylating agents which contain at least 10 carbon atoms.

7. Process for the manufacture of alkylated imidazoles of high molecular weight, consisting in treating imidazoles of the atom grouping

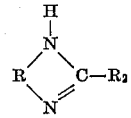

in which R is an aromatic nucleus of the benzene series and in which the μ-substituent $R_2$ consists of an alkyl radical containing itself at the most 3 carbon atoms, with such alkylating agents which consist of at least 10 carbon atoms united with one another.

8. Process for the manufacture of alkylated imidazoles of high molecular weight, consisting in treating imidazoles of the atom grouping

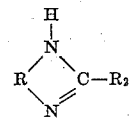

in which R is an aromatic nucleus of the benzene series and in which the μ-substituent $R_2$ consists of an alkyl radical containing itself at the most 3 carbon atoms, with such alkylating agents which contain at least 18 carbon atoms.

9. Process for the manufacture of alkylated imidazoles of high molecular weight, consisting in treating imidazoles of the atom grouping

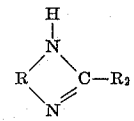

in which R is an aromatic nucleus of the benzene series and in which the μ-substituent $R_2$ consists of an alkyl radical containing itself at the most 3 carbon atoms, with such alkylating agents which consist of at least 18 carbon atoms united with one another.

10. The imidazolium compounds characterized by the atom grouping

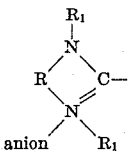

in which one $R_1$ represents an alkyl group containing at least 7 carbon atoms, the other $R_1$ an alkyl group containing less than 7 carbon atoms, R represents a carbocyclic aromatic nucleus containing at the most 10 carbon atoms and $R_2$ is a member selected from the group consisting of hydrogen and alkyl, which products represent fat-like masses dissolving in water with formation of highly capillary active solutions.

11. The imidazolium compounds characterized by the atom grouping

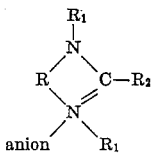

in which one R₁ represents an alkyl group containing at least 7 carbon atoms, the other R₁ an alkyl group containing less than 7 carbon atoms, R represents an aromatic nucleus of the benzene or naphthalene series, and R₂ is a member selected from the group consisting of hydrogen and alkyl, which products represent fat-like masses dissolving in water with formation of highly capillary active solutions.

12. The imidazolium compounds characterized by the atom grouping

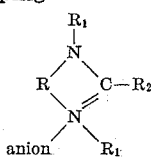

in which one R₁ represents an alkyl group containing at least 7 carbon atoms, the other R₁ an alkyl group containing less than 3 carbon atoms, R represents an aromatic nucleus of the benzene or naphthalene series, and R₂ is a member selected from the group consisting of hydrogen and alkyl, which products represent fat-like masses dissolving in water with formation of highly capillary active solutions.

13. The imidazolium compounds characterized by the atom grouping

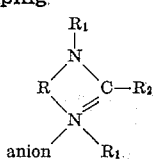

in which one R₁ represents an alkyl group containing at least 9 carbon atoms, the other R₁ an alkyl group containing less than 3 carbon atoms, R represents an aromatic nucleus of the benzene or naphthalene series, and R₂ is a member selected from the group consisting of hydrogen and alkyl, which products represent fat-like masses dissolving in water with formation of highly capillary active solutions.

14. The imidazolium compounds characterized by the atom grouping

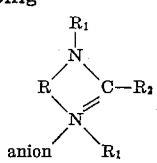

in which one R₁ represents an alkyl group consisting of at least 9 carbon atoms, the other R₁ an alkyl group containing less than 3 carbon atoms, R represents an aromatic nucleus of the benzene series, and R₂ is a member selected from the group consisting of hydrogen and alkyl, which products represent fat-like masses dissolving in water with formation of highly capillary active solutions.

15. The imidazolium compounds of the general formula

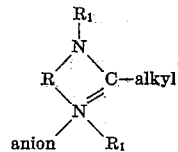

in which one R₁ represents an alkyl group consisting of at least 9 carbon atoms, the other R₁ an alkyl group consisting of less than 3 carbon atoms, and R an aryl radical of the benzene series, which products represent fat-like masses dissolving in water with formation of highly capillary active solutions.

16. The imidazolium compounds of the general formula

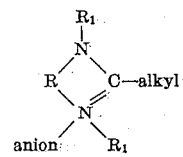

in which one R₁ represents an alkyl group consisting of an uninterrupted chain of at least 9 carbon atoms, the other R₁ an alkyl group consisting of an uninterrupted chain of less than 3 carbon atoms, and R an aryl radical of the benzene series, which products represent fat-like masses dissolving in water with formation of highly capillary active solutions.

17. The imidazolium compounds of the general formula

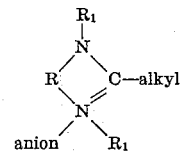

in which one R₁ represents an alkyl group consisting of an uninterrupted chain of 16 carbon atoms, the other R₁ a methyl group, and R an aryl radical of the benzene series, which products represent fat-like masses dissolving in water with formation of highly capillary active solutions.

18. The imidazolium compounds of the general formula

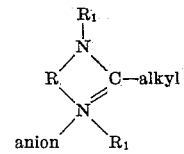

in which one R₁ represents a chain consisting of 16 carbon atoms and being interrupted by an organogenic element which in respect of hydrogen is not higher than trivalent, the other R₁ a methyl group, and R an aryl radical of the benzene series, which products represent solid, fat-like masses soluble in water with formation of highly capillary active solutions.

19. The imidazolium compounds of the general formula

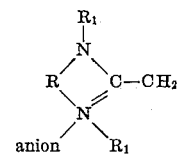

in which one R₁ represents a chain consisting of 16 carbon atoms and being interrupted by an organogenic element which in respect of hydrogen is not higher than trivalent, the other $R_1$ a methyl group, and R a benzene radical, which products represent solid, fat-like masses soluble in water with formation of highly capillary active solutions.

20. The imidazolium compounds of the general formula

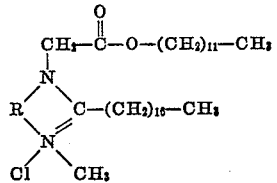

in which R represents an aryl radical of the benzene series, which products represent solid, fat-like masses soluble in water with formation of highly capillary active solutions.

CHARLES GRAENACHER.
FRANZ ACKERMANN.